Oct. 13, 1936. F. A. SMITH Re. 20,132
ADJUSTABLE WINDOW WING
Original Filed July 8, 1933
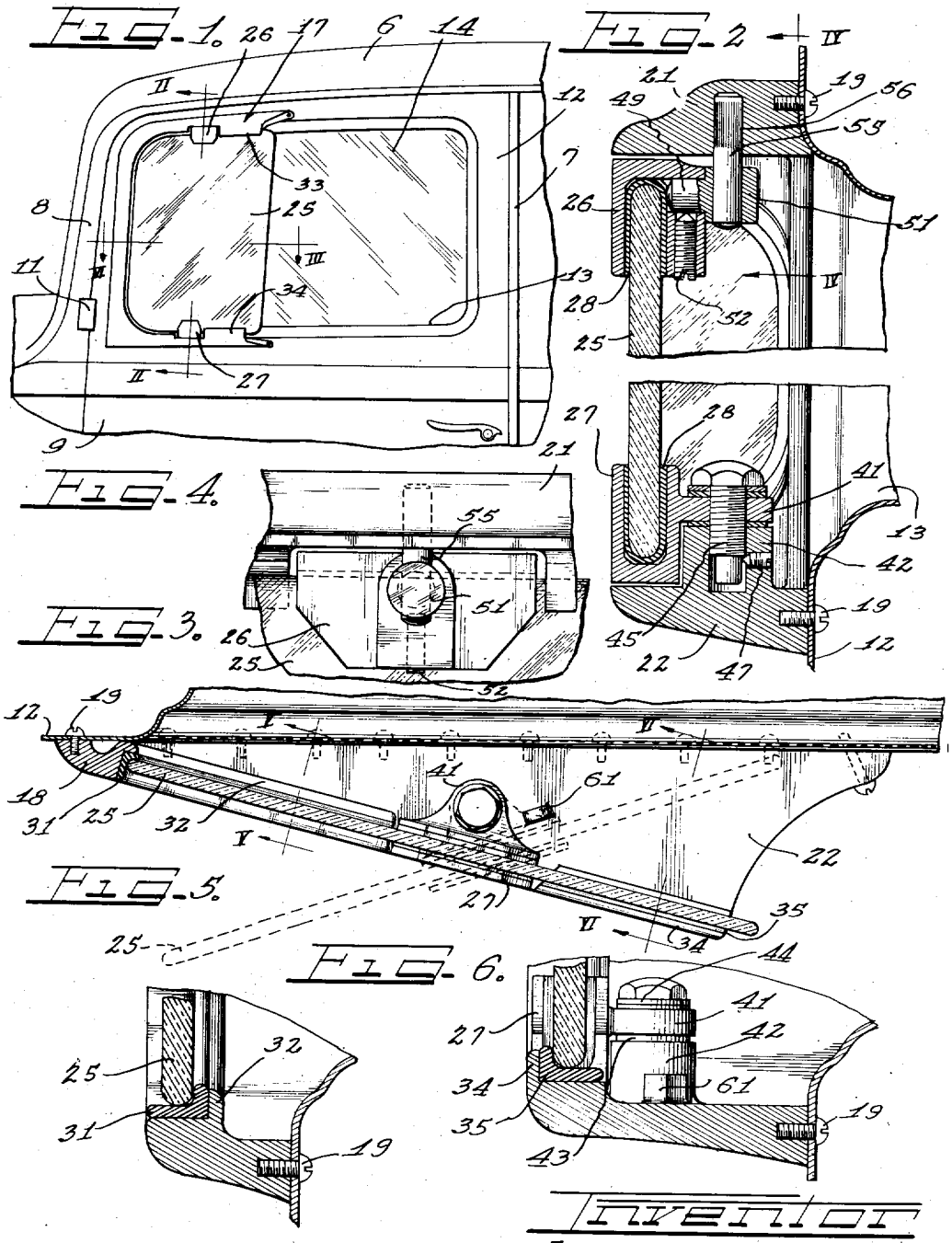
INVENTOR
FREDERICK A. SMITH.
BY: Charles W. Hills ATTY.

Reissued Oct. 13, 1936

Re. 20,132

UNITED STATES PATENT OFFICE 20,132

ADJUSTABLE WINDOW WING

Frederick A. Smith, North Chicago, Ill., assignor, by mesne assignments, to Houde Engineering Corporation, Buffalo, N. Y., a corporation of New York Original No. 2,008,160, dated July 16, 1935, Serial No. 679,455, July 8, 1933. Application for reissue June 22, 1936, Serial No. 86,586

12 Claims. (Cl. 296—84)

This invention relates to wind deflectors and will be described as incorporated in a device suitable for deflecting currents of air adjacent a door or window of any automobile and being of the type generally known as window wing.

An object of this invention is the provision of an improved window wing assembly which is adapted to deflect wind from a window in one position and which, when in another position, is adapted to cause air to be deflected into the window.

A further object is the provision of such a device, of a construction adapted to streamline with the body of the car so as to minimize windage friction when in normal position for deflecting air outwardly from the window.

A further object is the provision of a window wing assembly adapted to streamline with the body at the forward edge and having means associated therewith whereby the deflecting element may be swung outwardly to direct currents of air into the window.

Other objects and advantages of this invention will become apparent to those skilled in the art, from the following detailed description of one embodiment of this invention illustrated in the accompanying drawing.

On the drawing:

Figure 1 is a fragmentary elevational view of the forward upper portion of an automobile body and illustrating my invention incorporated therewith.

Figure 2 is an enlarged fragmentary vertical section taken on the line II—II of Figure 1.

Figure 3 is an enlarged horizontal section taken on the line III—III of Figure 1.

Figure 4 is a fragmentary elevation taken on the line IV—IV of Figure 2.

Figure 5 is a fragmentary section taken on the line V—V of Figure 3.

Figure 6 is a fragmentary section taken on the line VI—VI of Figure 3.

As shown on the drawing:

For the purpose of illustration, this invention has been shown incorporated with the window portion of an automobile door, although it is within the scope of the invention to be employed in various ways and on various window arrangements. In Figure 1 the portion of the automobile body illustrated comprises a top 6 supported by frame members 7 and 8. A door 9 connected to the frame 8 by a hinge 11 closes the space between the top 6 and the supporting frame members 7 and 8. The upper portion 12 of the door is provided with an opening 13 which may be closed by a pane of glass 14.

When the glass 14 does not close the opening 13, there would normally be a strong draft of air entering the opening or window if the automobile is moving forward, were it not for the provision of means to deflect the air from the window. Heretofore, various devices have been constructed for this purpose and have been generally known as window wings. Heretofore, such wings have been particularly objectionable for use on high speed cars, because of the projecting portions which did not properly streamline with the body and which, as a result, greatly increased the windage friction of an automobile moving at a high rate of speed.

In order to overcome disadvantages heretofore inherent in window wings, I have provided a frame designated generally by the numeral 17. The frame 17 comprises a forward substantially wedge-shaped portion 18 the edge of which tightly engages the upper portion of the door or window frame 12 and is secured in position by a set screw 19 as shown in Figure 3. Upper and lower portions of the frame designated, respectively, by numerals 21 and 22, extend part way along the upper and lower edges of the window opening and increase in width from the narrow front portion 18 to the extreme rear end forming a wedge in vertical projection.

The frame 17 is permanently secured to the door or window frame 12 by a plurality of set screws 19, as best illustrated in Figures 2 and 3.

Between the opposed edges of the frame 17 is mounted a wind deflecting element 25 preferably of plate glass, by pivotal clips 26 and 27, best illustrated in Figure 2. Suitable packing material, preferably having a resilient quality, is disposed within the clips 26 and 27 and interposed between the metal of the clips and the glass deflecting element 25, as indicated at 28, this serving both as a means for frictionally securing the glass 25 within the clips and to prevent rattling of the glass, or damage to the glass by direct contact with the clips. As will be seen from an inspection of Figures 2 and 3, the clips 26 and 27 are mounted with their outer surfaces substantially flush with the outer surface of the frame 17, for the purpose of reducing to a minimum the windage friction of the device as a whole. The glass 25 is of a size and shape to fit snugly within the opposed portions of the frame 17. When in closed position, as indicated in full lines in Figure 3, the glass 25 abuts an angle-shaped lining member 31 preferably of relatively soft rubber or the like which is seated in the opening of the frame 17 and supported against movement toward the window by an upstanding flange 32 on the frame extending from the clip 26 to the clip 27 forwardly thereof. Rearwardly of the clips 26 and 27, the frame 17 is provided with vertically extending flanges 33 and 34 which provide a seat for angle-shaped gaskets 35 interposed between the flanges and the edge of the glass 25, to prevent chipping of the glass and to provide a substantially air-tight seal between the glass and the frame 17, when in closed position.

The clip 27 is provided with an integral lug 41 supported by a lug 42 on the frame portion 22. A washer 43 is interposed between the lugs 41 and 42, to provide a bearing surface. A plurality of washers 44 are seated upon the lug 41 and a bolt 45 extends downwardly through the washers and through the lugs 41 and 42 as best illustrated in Figure 2. The lower end of the bolt 45 is of reduced cross section and is secured from rotation by a set screw 47, which results in the bolt 45 being securely retained in position, because of its threaded engagement within the lugs 42.

The clip 26 for holding the upper edge of the glass 25 is provided with an opening into which is fitted the shank 49 of a stud 51. The shank 49 is secured in position by a set screw 52, in a manner that the glass 25, together with the clips 26 and 27, may be quickly installed in position simply by the removal of the set screws 47 and 52 and the bolt 45. The head of the stud 51 is mounted on a pivot pin 55 which is tightly fitted in a bore 56, in the upper frame portion 21.

By this arrangement, it will be seen that the glass deflecting element 25, when in the full line position as shown in Figure 3, is substantially sealed with relation to the frame 17, and that the deflecting glass 25 may be rotated through a relatively large angle by reason of the pivotal support for the clips 26 and 27 which hold the glass in position. The lower frame member 22 is preferably provided with an integral lug 61 adapted to be engaged by the clip 27 when the same is rotated on the axis of the bolt 45, such that the lug 61 will limit the rotary movement of the clip 27, to prevent the rear edge of the glass 25 from contacting the window frame 12 or the glass 14 forming a closure for the window.

From the foregoing description, it will be appreciated by those skilled in the art that I have provided an improved window wing, which, when in normal position, forms a streamline effect with the body at the forward edge and reduces to a minimum the windage friction. It will be also understood that by opening the window of the automobile and rotating the deflector to the position shown in broken lines in Figure 3, a draft of air may be caused to drive directly into the window for the purpose of ventilating the interior of the automobile. Various changes and modifications may be made which differ in construction from that shown in the accompanying drawing, without departing from the principle of the invention, and I desire that the patent to be granted hereon shall not be limited in any manner except as necessitated by the prior art and the scope of the appended claims.

I claim as my invention:

1. A device of the class described comprising a frame tapered to an edge at the front for engagement with the door of an automobile exterior of the window therein, said frame including upper and lower portions gradually increasing in width toward the rear, journal members on said frame portion, a deflecting element disposed between opposed edges of said upper and lower frame portion, and mounting clips on said element disposed for rotation about the axis of said journal elements and being disposed wholly at one side and toward the window from the plane of the outer surface of the frame to produce a streamline effect, and resilient packing means disposed between said clips and the edge of the deflecting element.

2. A device of the class described comprising a frame substantially rectangular in vertical projection and being tapered toward the front, said frame including upper and lower portions having opposed edges and being adapted for rigid attachment to a door of an automobile exterior of the window therein to form a streamline effect with the door and extending above and below and around the forward edge of the window in the door, a transparent air deflecting element pivotally mounted between the upper and lower portions of the frame and disposed between opposed edges of the frame and wholly spaced toward the door from the plane of the outer surface of the frame, vertical flanges on said upper and lower frame portions providing abutments for the margins of the deflector element when in closed position, said flanges being disposed to permit outward swinging movement of the forward edge of the deflecting element and keep said element away from the window in the door.

3. A device of the class described comprising a frame substantially rectangular in vertical projection and being tapered toward the front, said frame including upper and lower portions having opposed edges and being adapted for rigid attachment to a door of an automobile exterior of the window therein to form a streamline effect with the door and extending above and below the window opening in the door, a transparent air deflecting element pivotally mounted between the upper and lower portions of the frame and disposed between opposed edges of the frame and wholly spaced toward the door from the plane of the outer surface of the frame, vertical flanges on said upper and lower frame portions providing abutments for the margins of the deflector element when in closed position, said flanges being disposed to permit outward swinging movement of the forward edge of the deflecting element, and stop means on said frame to limit such outward swinging movement to keep said element spaced from the window in the door.

4. A device of the class described comprising a frame substantially rectangular in vertical projection and being tapered toward the front, said frame including upper and lower portions having opposed edges and being adapted for rigid attachment to a door of an automobile to form a streamline effect with the door and extending above and below the opening in the door, a transparent air deflecting element pivotally mounted between the upper and lower portions of the frame and disposed between opposed edges of the frame and wholly spaced toward the door from the plane of the outer surface of the frame, vertical flanges on said upper and lower frame portions providing abutments for the margins of the deflector element when in closed position, said flanges being disposed to permit outward swinging movement of the forward edge of the deflecting element, and stop means on said frame to limit such outward swinging movement, and resilient lining members disposed on the opposed edges of the frame to engage sealingly the deflecting element when in closed position.

5. An air deflector comprising a frame adapted to be mounted on the outer face of an automobile adjacent the customary vehicle window, with portions of the frame extending above and below the window opening, said frame being wedge-shaped and including a thin, forward edge engaging the door to produce a streamline effect, said frame having a recess for the reception of a deflecting element, a deflecting element disposed therein, and pivot means for the element mounted on the upper and lower portions of the frame in opposed relation to permit outward swinging movement of the forward edge of the deflecting element, vertical flanges on opposed edges of the upper and lower frame portions disposed to prevent swinging movement of the forward edge of the deflecting element inwardly beyond a position in a plane parallel with the outer surface of the frame.

6. An air deflector comprising a frame adapted to be mounted on the outer face of an automobile door, with portions of the frame extending above and below the opening in the door, said frame being wedge-shaped and including a thin, forward edge engaging the door to produce a streamline effect, said frame having a recess for the reception of a deflecting element, a deflecting element disposed therein, and pivot means for the element mounted on the upper and lower portions of the frame in opposed relation to permit outward swinging movement of the forward edge of the deflecting element, vertical flanges on opposed edges of the upper and lower frame portions disposed to prevent swinging movement of the forward edge of the deflecting element inwardly beyond a position in a plane parallel with the outer surface of the frame, and stop means on said frame to limit the outward swinging movement of the deflecting element.

7. A device of the character described, including a frame comprising upper and lower portions and a joining substantially vertical forward portion for rigid attachment to a vehicle around the forward portion of the customary window, said frame tapering forwardly to a fine edge on said joining portion to produce a streamline effect, a pivotal air deflecting element carried in said frame, and means comprising a flange on said frame for forming a seat for the element and permitting the forward end of said element to pivot outwardly relatively to the vehicle window and also limit the movement of said element to maintain the same spaced from said window at all times.

8. An air deflector comprising a frame for attachment to the outer face of a vehicle adjacent to and outside of the customary vehicle window, said frame being wedge-shaped substantially in its entirety and including portions extending above and below the window opening and a joining portion tapering forwardly to a relatively fine edge to produce a streamline effect, said frame having a recess for a deflecting element, and a deflecting element pivoted in said recess in such a manner that the forward end of said element may be swung outwardly away from the vehicle window.

9. A device of the character described, including a U-shaped frame comprising upper and lower portions and a joining substantially vertical forward portion for rigid attachment to a vehicle around the forward portion of the customary window, the rear of said frame being open, a pivotal air deflecting element carried in said frame, and means on said frame to limit movement of said element to maintain the same spaced from said window.

10. An air deflector comprising a frame for attachment to the outer face of a vehicle adjacent to and outside of the customary vehicle window, said frame being wedge-shaped substantially in its entirety and including portions extending above and below the window opening and a joining portion tapering forwardly to a relatively fine edge to produce a streamline effect, said frame having a recess for a deflecting element, and a deflecting element pivoted in said recess.

11. An air deflector comprising a frame for attachment to the outer face of a vehicle adjacent to and outside of the customary vehicle window, said frame being wedge-shaped substantially in its entirety and including portions extending above and below the window opening and a joining portion tapering forwardly to a relatively fine edge to produce a streamline effect, said frame having a recess for a deflecting element, and a deflecting element pivoted in said recess in such a manner that movement of said element in one direction can be limited by the frame.

12. A device of the character described including a frame comprising upper and lower portions and a joining substantially vertical forward portion for attachment to a vehicle around the forward portion of the customary window, the rear end of the frame being open, a pivotal air deflecting element carried in said frame, and means on said frame to limit the movement of the element relative to the frame, said frame being recessed to provide a seat for the deflector element as well as an abutment flange to limit pivotal movement of the element.

FREDERICK A. SMITH.